Aug. 16, 1927.
G. LAFEVER
1,639,511
LOCK NUT
Filed Oct. 12, 1925
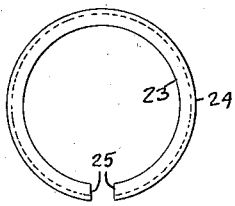
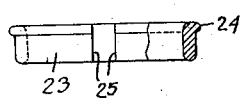
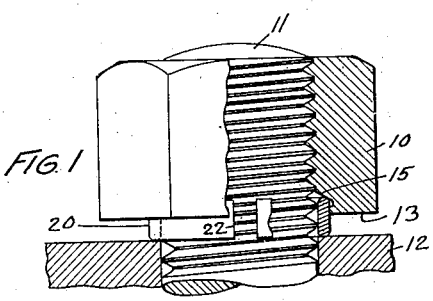
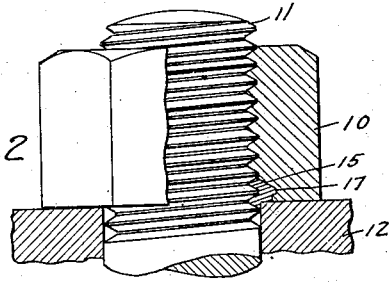
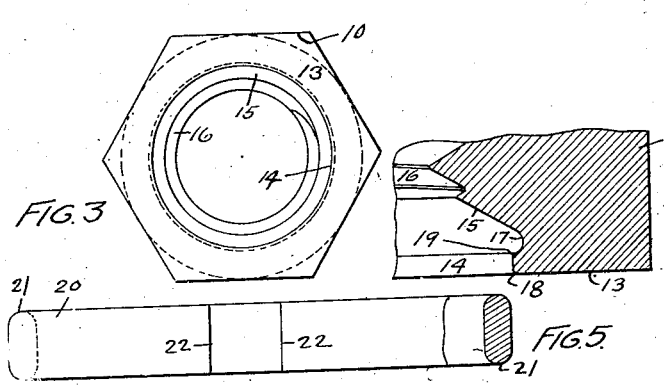
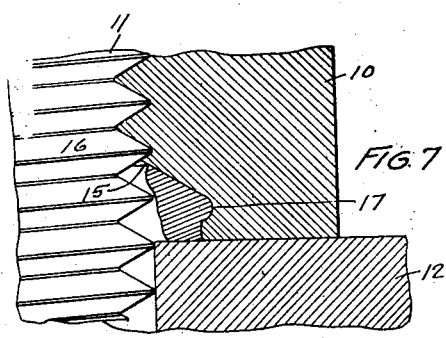
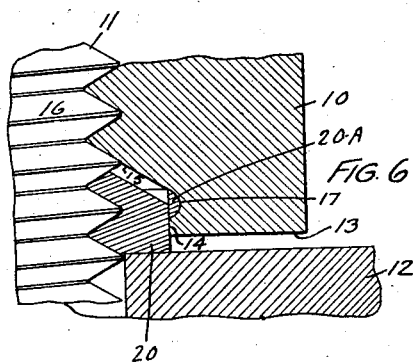
INVENTOR
GEORGE LAFEVER
By E. B. Birkenbeul
HIS ATTORNEY Patented Aug. 16, 1927.

1,639,511

UNITED STATES PATENT OFFICE.

GEORGE LAFEVER, OF RIDGEFIELD, WASHINGTON, ASSIGNOR TO AMERICAN LOCK NUT COMPANY, OF LONGVIEW, WASHINGTON.

LOCK NUT.

Application filed October 12, 1925. Serial No. 62,008.

This invention relates generally to means for holding nuts on bolts, and particularly to a special form of lock nut.

The first object of this invention is to provide an exceedingly simple and efficient form of lock nut which will be easy to make, easy to apply, and incapable of rotation due to vibration.

The second object is to securely lock the nut to the bolt without endangering the threads of either.

The third object is to so construct the device that a soft metal locking ring, preferably of copper or similar firm metal, is made to freeze to the bolt threads and to thereby prevent the nut from backing off without stripping the metal in the locking element, but at the same time to permit the nut to be rotated with a wrench without rotating the ring.

The fourth object is to so construct the device that the metal in the locking ring is capable of flowing around the bolt threads until the locking operation is completed, by which time the metal has become so hardened (due to compression) as to greatly increase the effectiveness of the lock.

The fifth object is to so construct the locking ring that no damage can be done to the bolt or nut by improper tightening or loosening with a wrench due to the presence of the locking device.

The sixth object is to so construct the soft metal locking ring that it may be inserted in the nut and held in position by means of the spring in the ring itself and the shoulder on the ring locking within the undercut channel in the nut.

The seventh object is to so slope the bottom of the recess in the nut that the first and greatest flow of metal in the ring will be on the bolt threads and that only enough metal will flow into the undercut channel in the nut as to prevent the separation of the nut and ring, except by sufficient application of force to shear off the metal in the undercut channel from the remainder of the ring.

These results are accomplished in the manner set forth in the following specification as illustrated in the accompanying drawing, in which:

Figure 1 is a partial longitudinal section through a nut and locking ring prior to locking. Figure 2 is a partial longitudinal section through a nut and locking ring after locking. Figure 3 is an end view of a nut from its locking end. Figure 4 is an enlarged fragmentary section through the nut showing the form of recess employed to receive the locking ring. Figure 5 is an enlarged view of the locking ring with a portion broken away in section. Figure 6 is a fragmentary section through a portion of the device showing what takes place when the nut is backed off with a wrench. Figure 7 is a similar section to Figure 6 but showing how the metal flows outwardly instead of inwardly if insufficient clearance is provided between the open ends of the locking ring. Figure 8 is a plan of a modified form of locking ring of which Figure 9 is an elevation with a portion broken away to show the cross section.

Similar numbers of reference refer to the same parts throughout the several views.

Referring in detail to the drawing, there is illustrated the usual form of hexagonal nut 10 which is placed on the bolt 11 whose threaded end projects through a plate 12 against which it is desired to tighten the nut 10.

In the side 13 of the nut 10 is formed a recess whose mouth 14 is somewhat cylindrical and whose end 15 slopes similarly to the sides 16 of the nut threads. Tangent to the end 15 and intersecting the mouth 14 is a curved groove 17 which forms an undercut in the side of the recess.

It is to be understood that the walls of the mouth 14, the end 15 and the groove 17 are made as smooth as possible in machining, and the corners 18 and 19 are broken to prevent any danger of a burr catching in the soft locking ring.

The locking ring itself consists of an open copper ring 20 of somewhat flat cross section and preferably, although not necessarily, having rounded edges 21 and having its open ends 22 separated by a space equal to not less than twice the depth of the threads in the bolt 11.

In Figures 8 and 9 the ring 23 is provided with an outwardly projecting flange 24 adapted to spring into the groove 17 of the nut 10. A similar clearance is maintained between the ring ends 25 as is required in the ring 20.

In Figure 6 the ring 20 has assumed the shape of the bolt threads on the inside, and the nut 10 is shown being backed off of the bolt 11 by a force sufficient to strip the flange 20^A from the ring 20. It will be understood that in this case the flange 20^A is formed during the locking action of the nut, but, if the ring shown in Figures 8 and 9 is employed, the flange 24 occupies the groove 17 instead.

It will also be borne in mind that in the locking action the original softness of the ring 20 is replaced by a condition of extreme hardness, which greatly resists this shearing.

After the nut 10 has entirely uncovered the ring 20 it is a simple matter to spring apart the open ends of the washer and free the bolt if desired.

If it is intended to replace the nut 10 on the bolt 11, it is, of course, necessary to first provide a new ring 20.

In Figure 7 is illustrated the condition which will arise if insufficient space is provided between the ring ends 25. In which case the metal crowds around the walls of the recess first, and with greater severity than against the threads of the bolt 11, which is the reverse of what is required for this purpose.

It must be borne in mind that the successful operation of this device depends entirely upon the complete freezing of the ring 20 around the bolt threads and the utter inability of the nut 10 to rotate said ring after having once been embedded in the threads.

I am aware that soft metal washers are of themselves not new since they have been employed, for example, in my United States Patent Number 1,443,751 and others, in which it is possible for the nut to rotate the soft metal ring, and in many instances the soft metal ring is embedded or set in the nut itself to insure this very condition which prevents the accomplishment of the result I attain; I therefore do not desire to claim the use of soft metal washers broadly, but I do intend to cover all such forms and modifications of this device as fall fairly within the appended claims.

I claim:

1. The combination with a bolt and a nut of a split ductile ring engaging the bolt and the nut, in which the nut has a counterbored undercut and the space between the ends of the ring is such that upon application of the nut the metal of the ring will flow and will engage the roots of the bolt threads before closing upon itself.

2. The device of claim 1 in which the ring is of a relatively soft metal which hardens upon being compressed and in which the metal flows upon application of the nut to fill the bolt thread roots before flowing to fill the undercut of the nut counterbore.

3. The device of claim 1 in which the counterbore has a conical wall leading to the nut threads and parallel with one surface of said nut threads.

4. The device of claim 1 in which the counterbore has a cylindrical wall and a conical wall and the undercut is between the conical wall and the cylindrical wall and is tangent to the conical wall, said undercut being an annular groove.

5. The combination with a bolt and a nut having a counterbore formed at one end of its tapped hole, said counterbore having undercut sides and a conical wall parallel with one surface of the threads in said nut, of an open ring of annealed copper adapted to occupy space in the mouth of said counterbore, the turning of said nut causing the metal in said ring to flow around the threads of a bolt in said nut and into the recess of said counterbore without enabling said nut to rotate said ring.

6. In combination, a bolt, a lock nut having a counterbore within its end sloping to its tapped hole, the mouth of said counterbore being generally cylindrical and having a rounded groove tangent to said sloping end; and a split ring adapted to fit into said counterbore against said mouth and sloping end, said ring when crushed into locking position having a projecting flange occupying said groove, said nut serving to cause the soft metal in said ring to flow around said threads and into said groove and thereby harden same without making it possible to rotate said ring by means of said nut, the space between the ends of the ring being such that the metal of the ring will flow into the roots of the bolt threads prior to the meeting of the two ends of the ring.

7. The combination of a counterbored undercut nut with a locking ring consisting of an open ring of highly ductile metal adapted to freeze to the threads of a bolt, said ring having a somewhat flat cross section and having an outwardly projecting flange formed around same, said ring having its open ends spaced not less than twice the depth of the threads in the nut with which it is used.

GEORGE LAFEVER.